Aug. 14, 1923.                                   1,465,197
J. C. WHITE
ANTIFRICTION INSERT FOR LEAF SPRINGS
Filed May 26, 1921
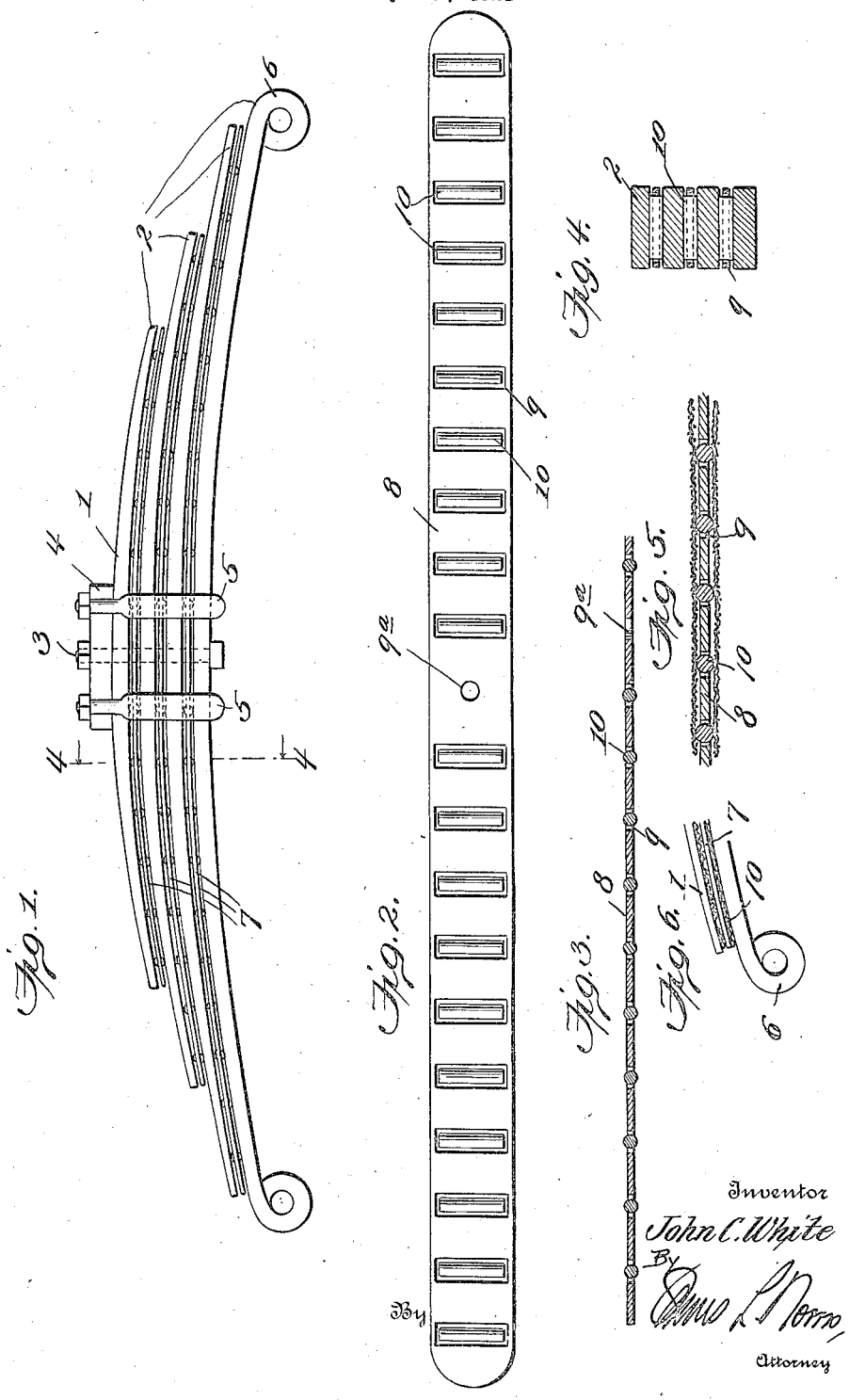

Patented Aug. 14, 1923.

1,465,197

UNITED STATES PATENT OFFICE.

JOHN C. WHITE, OF BOWLING GREEN, OHIO.

ANTIFRICTION INSERT FOR LEAF SPRINGS.

Application filed May 26, 1921. Serial No. 472,881.

*To all whom it may concern:*

Be it known that I, JOHN C. WHITE, a citizen of the United States, residing at Bowling Green, in the county of Wood and State of Ohio, have invented new and useful Improvements in Antifriction Inserts for Leaf Springs, of which the following is a specification.

This invention relates to antifriction inserts for springs and has for one of its objects the provision of a bearing retainer in the form of a single metallic strip carrying at close intervals anti-friction bearings which float in individual pockets cut in said strip.

Another object of the invention is to provide an anti-friction insert comprising a retaining strip having pockets in which bearings are retained, in which the thickness of the strip is so nearly the diameter of the bearings that, when said insert is inserted between two spring leaves, the space between the upper surface of said strip and an adjacent spring leaf will be just sufficient to support and maintain an oil film which will effectively seal the bearing against the intrusion of dust and which may be fed by its own surface tension from lubricant contained in the pockets.

Other objects will be disclosed as the description proceeds.

The invention will be best understood by reference to the accompanying drawings forming a part of this invention, in which:

Figure 1 is a front elevation of a leaf spring with my improved device inserted between the leaves.

Figure 2 is a plan view of one of the roller bearing inserts.

Figure 3 is a longitudinal sectional view through part of the strips shown in Figure 2.

Figure 4 is a transverse cross section taken on the line 4—4 of Figure 1.

Figure 5 is a fragmentary view of a modification of my improved device in which a flat strip of fabric is laid on each side of the insert.

Figure 6 is a detail view of a spring with the modification shown in Figure 5 inserted between the leaves.

In the drawing, in which like numerals are used to designate the same parts in the several figures, 1 designates the general assemblage of a vehicle spring consisting of a series of overlaid leaves 2 secured together intermediate their ends by a bolt 3 passing through a hole in each leaf, and secured to a body member 4 of the vehicle by the U-bolts 5. The lowermost leaf is formed at its outer ends with eyes, by means of which it is connected to the usual spring shackles, not shown.

Between the several leaves of the spring illustrated in Figure 1 are shown strips 7 of my roller bearing insert, one unit of which is shown in detail in Figures 2, 3 and 4. This insert comprises a thin strip 8 made of any suitable substance, preferably metal, punched in the center with a hole $9^a$ for the reception of the bolt 3 when the insert is put in place, and provided at intervals on either side of the center with rectangular pockets 9 extending entirely through the strip as shown in Figures 3 and 4.

Within the pockets 9 are anti-friction bearings 10, floatably retained, that is they are not mounted at all, but free to move either longitudinally or transversely as they may be impelled by the leaves of the spring in action. The bearings are shown as rollers but it is obvious that balls might be substituted therefor without departing from the invention.

An important feature of the invention is the construction by which the thickness of the strip 8 is almost as great as the diameter of the rollers 10, so that when the device is placed between the two leaves, a very narrow space is left between the upper surface of the strip and the lower surface of the spring leaf next above. This space is of such size as to permanently maintain or draw an oil film by the principle of surface tension when put in communication with a source of lubricant. The pockets are appreciably longer and wider than the bearings and are adapted to be filled with lubricant when the device is to be assembled. This will be drawn out by surface tension of the oil film and will replenish said film as the latter becomes exhausted.

The movement of the bearings from side to side within the pockets may assist in forcing a certain amount of lubricant out between the strip and spring leaf. However, the adhesion of the oil film to the adjacent surface exerts an enormous resistance to displacement so that the movement of the bearings in the pockets will in the main merely force the lubricant around the ends of said bearings from one side to the other within the pockets. In this way the lubricant will be used only as needed and the supply in the pockets will not be quickly exhausted. It is probable that the slight flexion of the spring leaves between adjacent rollers creates suction and to some extent assists in replenishing the oil film from the supply of lubricant in the pockets 9.

Another important function of the narrow space between the insert and the spring leaf is that, when it is occupied by the oil film the latter serves as a packing so that the pockets and bearings are isolated from access of dust.

In the modification shown in Figures 5 and 6 the space between the insert and spring leaves is occupied by a flat strip of fabric or other absorbent material to act as a wick in assisting the spread of the oil film and aid more positively in the exclusion of dust from the roller bearings. The fabric strip may be sold attached to the insert and covering the rollers, thus forming a satisfactory means for retaining the rollers in place in the pockets of the insert until the latter is put in place between two leaves of a spring. The rollers will then quickly wear through that part of the fabric which covers them and function directly against the surfaces of the adjacent spring leaves.

It is obvious that the specific details of construction and configuration of parts described herein may be modified in various ways without sacrificing the advantages of the invention or departing from the scope thereof as defined in the appended claims.

What I claim is:—

1. A spring comprising a plurality of overlaid resilient leaves, anti-friction bearings interposed between two of said leaves, a retaining strip for said bearings of uniform thickness having bearing apertures of sufficient width to permit limited travel of said bearings, the upper surface of said strip being spaced from the lower surface of the adjacent leaf by the bearings the proper distance to maintain an oil film therebetween.

2. A spring comprising a plurality of overlaid leaves and an anti-friction insert interposed between two of said leaves, said insert comprising a flat strip of uniform thickness having apertures therethrough arranged at intervals, said apertures serving as reservoirs for a lubricant, anti-friction bearings lying loosely in said apertures, said bearings being of slightly greater thickness than the thickness of the strip so that the upper surface of the strip and the lower surface of the adjacent spring leaf are separated the proper distance to support an oil film replenished by surface tension from the supply in said apertures.

3. An anti-friction insert for leaf springs comprising an integral metallic flat strip of uniform thickness having rectangular apertures punched therethrough at intervals throughout its length, roller bearings floatably mounted in said apertures, and capable of limited travel of said apertures, said bearings being of slightly greater diameter than the thickness of the strip so that the space between said strip and the adjacent surface of a spring leaf will be merely wide enough to be packed by an oil film.

4. An anti-friction insert for leaf springs comprising an integral metallic flat strip of uniform thickness having rectangular apertures punched therethrough at intervals throughout its length, roller bearings floatably retained in said apertures, said bearings being of slightly greater diameter than the thickness of the strip so that the space between said strip and the adjacent surface of a spring leaf will be merely wide enough to be packed by an oil film and a flat imperforate wick covering the flat surface of said insert and retaining said bearings in said apertures.

5. A vehicle spring comprising a plurality of parallel leaves increasing in length, spacers between adjacent leaves being formed of a uniform thickness throughout their length and having transverse apertures therethrough and extending partially to the edges of the spacers, cylindrical rollers loosely contained within the apertures said apertures being of such width and length as to allow relative movement between the rollers and the spacers, said rollers having their diameters slightly greater than the thickness of the spacers whereby, in assembled condition, a small portion of the upper periphery of each roller is visible between its spacer and the spring thereabove, substantially as set forth.

In testimony whereof I have hereunto set my hand in presence of two subscribing witnesses.

JOHN C. WHITE.

Witnesses:
A. G. CHISUC,
GEO. D. WAGONER.